US008803728B2

(12) United States Patent
Yonemoto et al.

(10) Patent No.: US 8,803,728 B2
(45) Date of Patent: Aug. 12, 2014

(54) MILLIMETER WAVE RADAR-EQUIPPED HEADLAMP

(75) Inventors: Naruto Yonemoto, Tokyo (JP); Akiko Kohmura, Tokyo (JP); Yoshiki Kurosawa, Shizuoka (JP); Takao Watanabe, Shizuoka (JP); Satoshi Yamamura, Shizuoka (JP)

(73) Assignees: Koito Manufacturing Co., Ltd., Tokyo (JP); Electronic Navigation Research Institute, Independent Administrative Institution, Tokyo (JP)

( * ) Notice: Subject to any disclaimer, the term of this patent is extended or adjusted under 35 U.S.C. 154(b) by 618 days.

(21) Appl. No.: 13/105,350

(22) Filed: May 11, 2011

(65) Prior Publication Data
US 2011/0279304 A1    Nov. 17, 2011

(30) Foreign Application Priority Data
May 11, 2010    (JP) ................. 2010-109058

(51) Int. Cl.
*G01S 13/00* (2006.01)
*B60Q 1/00* (2006.01)
*F21V 7/00* (2006.01)

(52) U.S. Cl.
USPC ............. 342/70; 342/175; 362/487; 362/517; 362/518; 362/539

(58) Field of Classification Search
CPC ......... G01S 13/93; G01S 13/931; G08G 9/02; G08G 1/16; G08G 1/166; G08G 1/167; B60R 2300/804; B60R 2300/301; B60R 2021/0004; B60Q 1/143; B60Q 1/0023; B60Q 9/008

USPC ............... 342/70–72, 175; 362/509, 516–519
See application file for complete search history.

(56) References Cited

U.S. PATENT DOCUMENTS

| 3,273,155 | A | * | 9/1966 | Raabe | 343/753 |
|---|---|---|---|---|---|
| 4,037,228 | A | * | 7/1977 | Pearson | 342/7 |
| 5,313,213 | A | * | 5/1994 | Neumann et al. | 342/165 |
| 5,486,950 | A | * | 1/1996 | Collinge | 359/565 |
| 5,546,284 | A | * | 8/1996 | Harada | 362/487 |
| 5,675,349 | A | * | 10/1997 | Wong | 343/910 |
| 5,963,172 | A | * | 10/1999 | Pfizenmaier et al. | 343/721 |
| 6,137,434 | A | * | 10/2000 | Tohya et al. | 342/70 |
| 6,169,478 | B1 | * | 1/2001 | Hada et al. | 340/435 |
| 6,268,833 | B1 | * | 7/2001 | Tanizaki et al. | 343/766 |
| 6,380,883 | B1 | * | 4/2002 | Bell et al. | 342/70 |

(Continued)

FOREIGN PATENT DOCUMENTS

| JP | 11-504756 A | 4/1999 |
|---|---|---|
| JP | 2001-260777 A | 9/2001 |
| JP | 2009-217495 A | 9/2009 |

*Primary Examiner* — Peter Bythrow
(74) *Attorney, Agent, or Firm* — Osha Liang LLP

(57) ABSTRACT

A millimeter wave radar-equipped headlamp includes a millimeter wave radar that detects an object ahead of a vehicle, and a lighting device unit that irradiates an area ahead of the vehicle. The lighting device unit incorporates an antenna module of the millimeter wave radar. The lighting device unit includes a projection lens, a light source, a reflector, and a shade. The antenna module includes a millimeter wave waveguide, and a millimeter wave reflection mirror. A reflection surface of the millimeter wave reflection mirror is formed by a spheroidal surface having a first focal point located in the vicinity of the opening of the millimeter wave waveguide, and a second focal point located forward of the rear focal point.

16 Claims, 8 Drawing Sheets

(56) References Cited

U.S. PATENT DOCUMENTS

| | | | |
|---|---|---|---|
| 6,459,476 B2 * | 10/2002 | Nishimura | 356/5.01 |
| 6,550,944 B2 * | 4/2003 | Kusagaya | 362/466 |
| 6,919,820 B2 * | 7/2005 | Makita et al. | 340/903 |
| 6,999,896 B2 * | 2/2006 | Takahashi | 702/181 |
| 7,429,918 B2 * | 9/2008 | Watanabe | 340/468 |
| 7,446,730 B2 * | 11/2008 | Yonemoto et al. | 343/872 |
| 7,453,374 B2 * | 11/2008 | Koike et al. | 340/903 |
| 7,535,406 B2 * | 5/2009 | Teranishi et al. | 342/70 |
| 7,576,701 B2 * | 8/2009 | McGrath et al. | 343/754 |
| 2004/0012973 A1 * | 1/2004 | Baker et al. | 362/464 |
| 2006/0202909 A1 * | 9/2006 | Nagai | 343/911 R |
| 2008/0158045 A1 * | 7/2008 | Teranishi et al. | 342/70 |
| 2008/0158897 A1 * | 7/2008 | Nakamura et al. | 362/487 |
| 2008/0180965 A1 * | 7/2008 | Nakamura et al. | 362/507 |
| 2008/0192496 A1 * | 8/2008 | Mochizuki et al. | 362/466 |
| 2008/0238790 A1 * | 10/2008 | McGrath et al. | 343/754 |
| 2009/0190323 A1 * | 7/2009 | Watanabe et al. | 362/37 |
| 2009/0219191 A1 * | 9/2009 | Natsume et al. | 342/109 |
| 2010/0171673 A1 * | 7/2010 | Guy et al. | 343/753 |

* cited by examiner

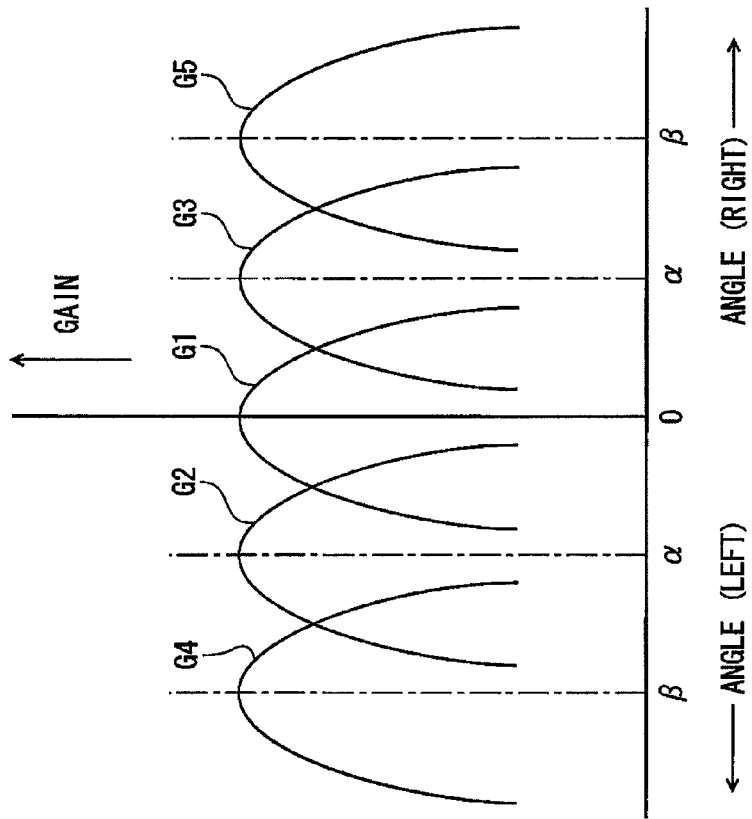
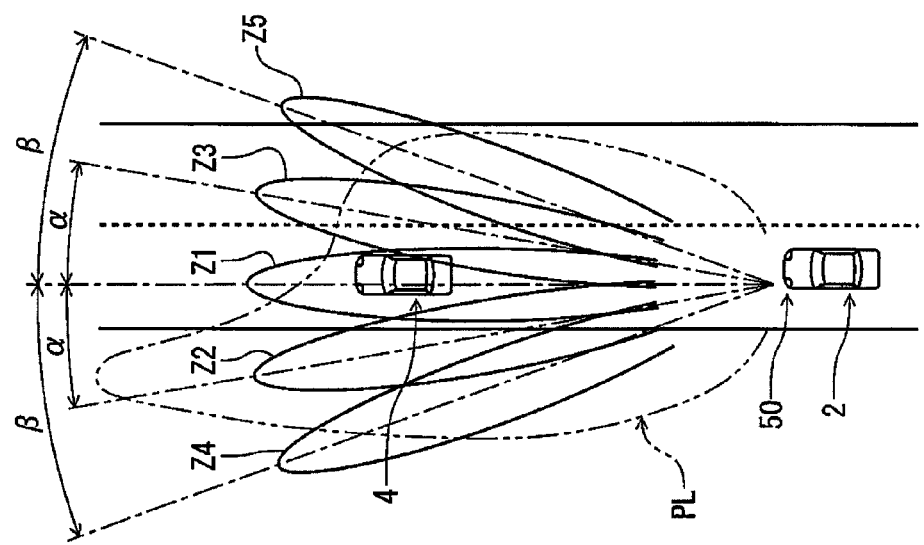

MILLIMETER WAVE RADAR-EQUIPPED HEADLAMP

CROSS REFERENCE TO RELATED APPLICATION(S)

This application claims the benefit of priority from Japanese Patent Application No. 2010-109058 filed on May 11, 2010, the disclosure of which is incorporated herein by reference in its entirety.

FIELD

An aspect of the invention of the present application relates to a millimeter wave radar-equipped headlamp realized by being equipped with a millimeter wave radar for detecting an object ahead of a vehicle.

BACKGROUND

A vehicle including a radar system for detecting an object ahead of the vehicle (e.g., a front-running vehicle or a fallen object on a road) is well known.

For example, JP-A-2009-217495 describes a structure in which a millimeter wave radar usable even in fog or when it is raining or snowing is used as the foregoing radar system.

Further, JP-A-2001-260777 describes a structure in which a laser radar is placed beside a lighting device unit inside a lighting chamber of a headlamp.

Moreover, JP-W-11-504756 describes a structure in which an antenna module of a microwave radar and a dielectric lens are incorporated into a lighting device unit of a headlamp.

The headlamp described in JP-A-2001-260777 may alternatively have a structure in which a millimeter wave radar is placed inside the lighting chamber instead of the laser radar.

However, in such a case, the millimeter wave radar may be seen directly through a translucent cover of the headlamp, and therefore, the appearance of the headlamp may be degraded. In addition, a placement space for the millimeter wave radar has to be ensured inside the lighting chamber, thus making it difficult to make the headlamp compact in size.

On the other hand, when the lighting device unit described in JP-W-11-504756 has a structure in which an antenna module of a millimeter wave radar is incorporated into the lighting device unit, an electromagnetic lens for millimeter waves has to be placed together with an optical lens. Thus, such a lighting device structure may be complicated.

SUMMARY

One or more embodiments of the present invention provides a millimeter wave radar-equipped headlamp realized by being equipped with a millimeter wave radar for detecting an object ahead of a vehicle, in which the headlamp is not degraded in appearance, is made compact and simple in structure, and is capable of ensuring functions of the millimeter wave radar.

According to one or more embodiments of the present invention, a projector type lighting device unit including a shade is adopted as a lighting device unit, and its projection lens is used as a electromagnetic lens for millimeter waves in a shared manner; in addition, an ingenious structure of an antenna module of a millimeter wave radar is provided.

Specifically, according to one or more embodiments of the present invention, there is provided a millimeter wave radar-equipped headlamp millimeter wave radar-equipped headlamp includes: a millimeter wave radar that detects an object ahead of a vehicle, wherein the millimeter wave radar comprises an antenna module; and a lighting device unit that applies light toward an area ahead of the vehicle, wherein the lighting device unit incorporates the antenna module, wherein the lighting device unit includes: a projection lens located on an optical axis extending in a longitudinal direction of the vehicle; a light source located at a rearward position with respect to a rear focal point of the projection lens; a reflector that reflects light emitted from the light source toward the projection lens; and a shade that partially blocks reflection light from the reflector, wherein the shade is placed so that upper edge of the shade is located in the vicinity of the optical axis, wherein the antenna module includes: a millimeter wave waveguide located below the optical axis and in the vicinity of the front of the shade; and a millimeter wave reflection mirror located between an opening of the millimeter wave waveguide and the shade, and wherein a reflection surface of the millimeter wave reflection mirror is formed by a spheroidal surface by which a point located in the vicinity of the opening of the millimeter wave waveguide is defined as a first focal point, and a certain point located forward of the rear focal point is defined as a second focal point.

According to one or more embodiments of the present invention, the "light source" may be located on the optical axis or may be located at a position deviated from the optical axis. Furthermore, the type of the "light source" is not particularly limited; for example, a component such as a discharge light-emitting part of a discharge bulb, a filament of a halogen bulb or a light-emitting chip of a light-emitting diode may be adopted as the "light source."

According to one or more embodiments of the present invention, the "certain point" means a point located at a position through which millimeter waves are emitted as plane waves toward an area ahead of a vehicle via the projection lens when the millimeter waves are emitted through this "certain point."

As long as the antenna module of the "millimeter wave radar" is incorporated into the lighting device unit, the incorporation of the other part(s) of the "millimeter wave radar" into the lighting device unit is optional.

The inventors of the present invention conducted studies on millimeter waves, and consequently found that a projection lens of a projector type lighting device unit exerts a convergence action not only on visible light but also on millimeter waves and a focal distance of millimeter waves is shorter than that of visible light in this case.

According to such findings, an antenna module of a millimeter wave radar can be incorporated into a projector type lighting device unit, and a projection lens thereof can be used as an electromagnetic lens for millimeter waves in a shared manner as in one or more embodiments of the present invention.

In a millimeter wave radar-equipped headlamp according to one or more embodiments of the present invention, an antenna module of a millimeter wave radar of the headlamp is formed to include: a millimeter wave waveguide located below an optical axis and in the vicinity of the front of a shade; and a millimeter wave reflection mirror located between an opening of the millimeter wave waveguide and the shade. Therefore, blockage of reflection light from a reflector due to the incorporation of the antenna module into a lighting device unit can be prevented from occurring. Further, the adoption of such a structure can prevent the millimeter wave radar from being seen directly through a translucent cover of the headlamp, thereby making it possible to prevent the appearance of the headlamp from being degraded. Moreover, the adoption of such a structure can eliminate the necessity for newly ensuring a placement space for the millimeter wave radar inside a lighting chamber, thereby allowing the headlamp to have a compact and simple structure.

Besides, in the millimeter wave radar-equipped headlamp according to one or more embodiments of the present invention, a reflection surface of the millimeter wave reflection mirror is formed by a spheroidal surface by which a point located in the vicinity of the opening of the millimeter wave waveguide is defined as a first focal point, and a certain point located forward of a rear focal point of a projection lens is defined as a second focal point. Hence, millimeter waves, emitted from the opening of the millimeter wave waveguide, will be emitted as plane waves toward an area ahead of the vehicle via the projection lens. Accordingly, it is possible to ensure functions of the millimeter wave radar.

According to one or more embodiments of the present invention, in the millimeter wave radar-equipped headlamp realized by being equipped with the millimeter wave radar for detecting an object ahead of the vehicle, the headlamp is not degraded in appearance, is made compact and simple in structure, and is capable of ensuring the functions of the millimeter wave radar as described above.

When a plurality of the millimeter wave waveguides are placed at regular intervals in a lateral direction in the above-described structure, a detectable range of an object ahead of the vehicle can be increased in the lateral direction.

Alternatively, also when a plurality of the antenna modules are placed at regular intervals in a lateral direction, the detectable range of an object ahead of the vehicle can be increased in the lateral direction.

Additionally, according to one or more embodiments of the present invention, when the headlamp is formed to include a plurality of the lighting device units into each of which the antenna module is incorporated and positions of the antenna modules incorporated into the lighting device units are set at positions deviated from each other in a lateral direction between the lighting device units, the detectable range of an object ahead of the vehicle can be increased in the lateral direction.

When the projection lens is formed as a Fresnel lens and an optical path difference between lens portions of the Fresnel lens is set at an integral multiple of a wavelength of a millimeter wave used by the millimeter wave radar in the above-described structure, phases of millimeter waves passing through the projection lens can be aligned. Thus, the projection lens can be reduced in thickness, and attenuation of millimeter waves due to passage through the projection lens can be minimized.

When the millimeter wave reflection mirror is formed by a member that allows visible light to pass therethrough and an upper end portion of the millimeter wave reflection mirror extends above the optical axis in the above-described structure, utilization of more millimeter waves is enabled while the millimeter wave reflection mirror blocks virtually no reflection light from the reflector.

BRIEF DESCRIPTION OF THE DRAWINGS

FIG. 3A is a plan view illustrating emission ranges of millimeter waves emitted toward an area ahead of a vehicle from the millimeter wave radar of the millimeter wave radar-equipped headlamp, together with a low beam light distribution pattern formed on a road surface ahead of the vehicle by light applied from the lighting device unit.

FIG. 3B is a diagram illustrating gains of millimeter waves emitted from the millimeter-wave radar toward an area ahead of the vehicle.

DETAILED DESCRIPTION OF THE EMBODIMENTS

Hereinafter, embodiments of the invention of the present application will be described with reference to the drawings. The drawings and the associated descriptions are provided to illustrate embodiments of the invention and are not intended to limit the scope of the invention. In the embodiments of the invention disclosed, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
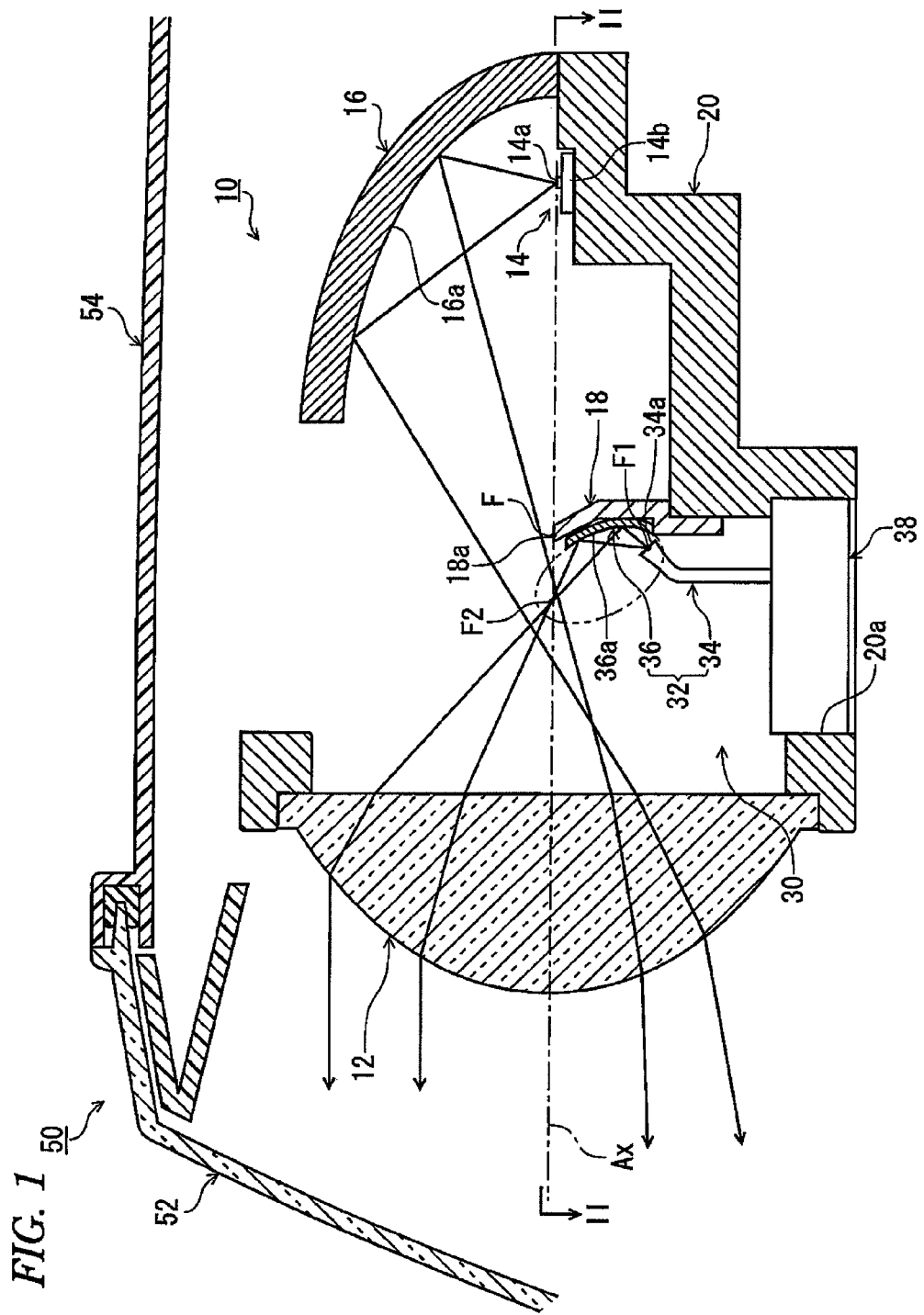
FIG. 1 is a lateral cross-sectional view illustrating main parts of a millimeter wave radar-equipped headlamp according to one or more embodiments of the present invention.

FIG. 1 is a lateral cross-sectional view illustrating main parts of a millimeter wave radar-equipped headlamp 50 according to one or more embodiments of the present invention.

As illustrated in FIG. 1, the millimeter wave radar-equipped headlamp 50 is formed so that a lighting device unit 10 for applying light toward an area ahead of a vehicle is contained in a lighting chamber formed by a see-through translucent cover 52 and a lamp body 54. Further, the headlamp 50 is formed so that the lighting device unit 10 is equipped with a millimeter wave radar 30 for detecting an object ahead of the vehicle.

First, a structure of the lighting device unit 10 will be described.

The lighting device unit 10 is formed as a projector type lighting device unit for applying light to produce a low beam light distribution pattern for left light distribution, and is supported by the lamp body 54 via an unillustrated aiming mechanism so as to be inclined.

Figure 2:
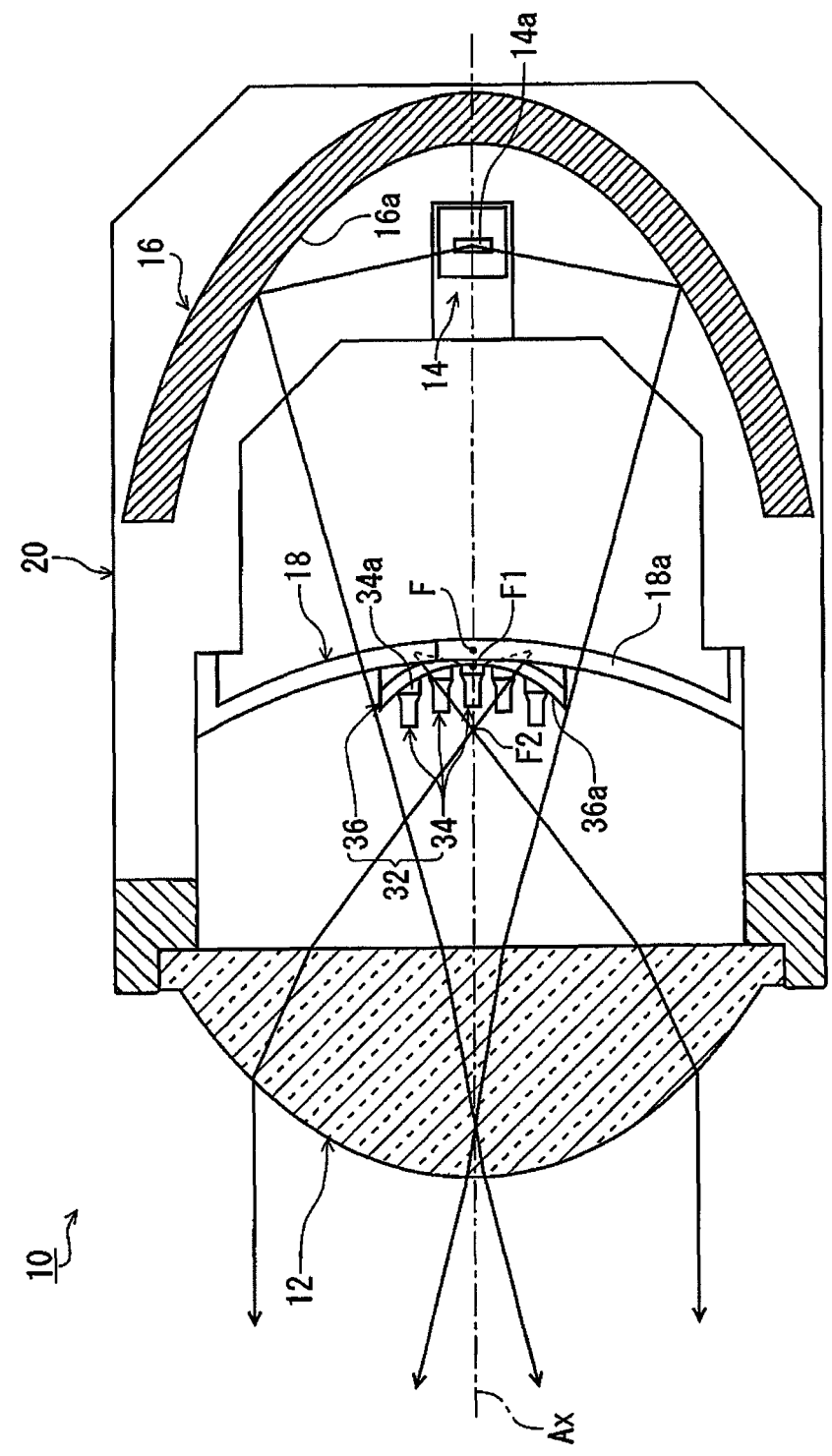
FIG. 2 is a cross-sectional view illustrating a lighting device unit of the millimeter wave radar-equipped headlamp and taken along the line II-II of FIG. 1.

FIG. 2 is a cross-sectional view illustrating the lighting device unit 10 and taken along the line II-II of FIG. 1.

As also illustrated in FIG. 2, the lighting device unit 10 includes: a projection lens 12 located on an optical axis Ax extending in a longitudinal direction of the vehicle; a light source 14a located at a rearward position with respect to a rear focal point F of the projection lens 12; a reflector 16 by which light emitted from the light source 14a is reflected toward the projection lens 12; a shade 18 for partially blocking reflection light from the reflector 16; and a holder 20 for supporting these constituent elements.

Furthermore, in a state where the millimeter wave radar-equipped headlamp 50 is equipped with the lighting device unit 10 as its component, the lighting device unit 10 is placed with the optical axis Ax extended downward at an angle of about 0.5° to about 0.6° with respect to the vehicle longitudinal direction.

The projection lens 12 includes a planoconvex aspherical lens in which a frontward surface is a convex surface and a rearward surface is a flat surface, and a light source image formed on a rear focal plane of the lens (i.e., a focal plane thereof including the rear focal point F) is projected as a reversed image onto an imaginary perpendicular screen located forward of a lighting device.

The projection lens 12 is a synthetic resin lens and has the property of making a millimeter wave focal distance somewhat shorter than a visible light focal distance. Specifically, the projection lens 12 is an acrylic resin (PMMA) lens and has the property of allowing a visible light focal distance to be about 55 mm and allowing a millimeter wave (e.g., 76 GHz millimeter wave) focal distance to be about 40 mm to about 55 mm.

The light source 14a is a light-emitting chip of a white light-emitting diode 14, provided with a laterally elongated rectangular light-emitting surface, and supported on a substrate 14b. Further, the white light-emitting diode 14 is fixed on the holder 20 in a state where the light-emitting surface of the light-emitting chip is located on the optical axis Ax so as to face perpendicularly upward.

The reflector 16 is located so as to cover the light source 14a from above in the form of an approximate semidome, and is fixed at its lower edge on the holder 20. A reflection surface 16a of the reflector 16 is formed by an approximately elliptic curved surface by which a light-emitting center of the light source 14a is defined as a first focal point and a point located forward of the first focal point is defined as a second focal point, and settings are made so that an eccentricity of the curved surface is gradually increased from a perpendicular cross section toward a horizontal cross section.

The shade 18 is located so that its upper edge 18a passes through the rear focal point F. In one or more embodiments of the present invention, the upper edge 18a is formed so as to be bent forward toward both of right and left sides from a position on the optical axis Ax. Moreover, a left side region of the upper edge 18a, located leftward with respect to the optical axis Ax, is extended within a horizontal plane including the optical axis Ax, while a right side region of the upper edge 18a, located rightward with respect to the optical axis Ax, is extended within a horizontal plane located one step lower than the left side region via a short inclined surface. The shade 18 is fixed at its lower end portion on the holder 20.

Furthermore, the lighting device unit 10 produces a low beam light distribution pattern for left light distribution by reversely projecting, via the projection lens 12, an image of the light source 14a, which is formed on the rear focal plane of the projection lens 12 by reflection light from the reflector 16. In this case, as a reverse projection image of the upper edge 18a of the shade 18, a laterally uneven cutoff line is formed at an upper edge of the low beam light distribution pattern.

Next, a structure of the millimeter wave radar 30 will be described.

The millimeter wave radar 30 includes: an antenna module 32 for emitting and receiving millimeter waves; and a control module 38 for performing control of the antenna module 32.

The antenna module 32 includes: five millimeter wave waveguides 34 located below the optical axis Ax and in the vicinity of the front of the shade 18; and a single millimeter wave reflection mirror 36 located between openings 34a of the five millimeter wave waveguides 34 and the shade 18.

The five millimeter wave waveguides 34 are located at a first position directly below the optical axis Ax, second and third positions located slightly laterally away from the first position, and fourth and fifth positions located slightly laterally away from the second and third positions.

Each of the millimeter wave waveguides 34 is extended upward and downward, and is provided at its upper end with the opening 34a. The opening 34a of each millimeter wave waveguide 34 is formed so as to be opened obliquely upward toward the rear. Further, each of the millimeter wave waveguides 34 is connected at its lower end to the control module 38. The control module 38 is fixed to a lower end opening 20a of the holder 20 in a state in which the control module 38 is contained in a casing.

A reflection surface 36a of the millimeter wave reflection mirror 36 is formed by a spheroidal surface by which a point F1 located in the vicinity of the opening 34a of the millimeter wave waveguide 34 placed at the first position is defined as a first focal point, and a certain point F2 located forward of the rear focal point F of the projection lens 12 is defined as a second focal point. In one or more embodiments of the present invention, the certain point F2 serving as the second focal point is set at a rear focal point position of the projection lens 12 for millimeter waves (i.e., a position located forward of the rear focal point F of the projection lens 12 by about 10 mm to about 15 mm on the optical axis Ax).

Thus, the millimeter wave reflection mirror 36 allows millimeter waves emitted from the opening 34a of the millimeter wave waveguide 34 at the first position to temporarily converge to the certain point F2, and then allows the millimeter waves to be emitted toward the projection lens 12 through the certain point F2. Then, as plane waves parallel to the optical axis Ax, the millimeter waves emitted through the certain point F2 are emitted toward an area ahead of the vehicle via the projection lens 12.

Besides, the millimeter wave reflection mirror 36 also allows millimeter waves emitted from the openings 34a of the millimeter wave waveguides 34 at the second to fifth positions to temporarily converge to points at which functions substantially similar to those achieved at the certain point F2 are achieved (i.e., points located at lateral positions with respect to the certain point F2 and in the vicinity of the rear focal plane of the projection lens 12 for millimeter waves), and then allows the millimeter waves to be emitted toward the projection lens through these points. Then, the millimeter waves emitted through each of these points are emitted as plane waves toward an area ahead of the vehicle at a horizontal deflection angle responsive to an amount of lateral displacement from the optical axis Ax.

An upper edge position of the millimeter wave reflection mirror 36 is set at a position located somewhat downwardly away from the optical axis Ax. Thus, the millimeter wave reflection mirror 36 is prevented from blocking reflection light from the reflector 16.

Further, the openings 34a of the millimeter wave waveguides 34 are located in the vicinity of a lower edge of the millimeter wave reflection mirror 36. Thus, most of the millimeter waves emitted from the openings 34a of the millimeter wave waveguides 34 and reflected by the millimeter wave reflection mirror 36 are allowed to be incident on the projection lens 12.

FIG. 3A is a plan view illustrating emission ranges Z1 to Z5 of millimeter waves emitted toward an area ahead of a vehicle from the millimeter wave radar 30 of the millimeter wave radar-equipped headlamp 50 according to one or more embodiments of the present invention, together with a low beam light distribution pattern PL (indicated by a chain double-dashed line in FIG. 3A) formed on a road surface ahead of the vehicle by light applied from the lighting device unit 10.

Note that FIG. 3A illustrates the case where the millimeter wave radar-equipped headlamp 50 is placed at a left front end portion of a vehicle 2, but the same goes for the case where the millimeter wave radar-equipped headlamp 50 is placed at a right front end portion of the vehicle 2.

As illustrated in FIG. 3A, of the five millimeter wave emission ranges Z1 to Z5, the center emission range Z1 located at a frontward position in the direction of the optical axis Ax is an emission range of millimeter waves emitted from the millimeter wave waveguide 34 located at the first position. The emission ranges Z2 and Z3, located laterally outwardly of the emission range Z1 in the directions of horizontal deflection angles α with respect to the optical axis Ax, are emission ranges of millimeter waves emitted from the millimeter wave waveguides 34 located at the second and third positions. And the emission ranges Z4 and Z5, located laterally outwardly of the emission ranges Z2 and Z3 in the directions of horizontal deflection angles β with respect to the optical axis Ax, are emission ranges of millimeter waves emitted from the millimeter wave waveguides 34 located at the fourth and fifth positions.

Adjacent ones of the five emission ranges Z1 to Z5 partially overlap one another, thus ensuring a wide emission range as a whole.

FIG. 3B is a diagram illustrating gains G1 to G5 of millimeter waves emitted from the millimeter wave radar 30 toward an area ahead of the vehicle.

Referring to FIG. 3B, the gains G1 to G5 are gains of millimeter waves emitted from the millimeter wave waveguides 34 located at the first to fifth positions, respectively.

Peaks of the gains G1 to G5 are located at angular positions of horizontal deflection angles 0, ±α and ±β with respect to the optical axis Ax, and the adjacent gains partially overlap one another. In one or more embodiments of the present invention, the respective angular positions of ±α and ±β will be defined by amounts of lateral displacement of the millimeter wave waveguides 34 at the second to fifth positions from the optical axis Ax.

Specifically, for example, when an amount of lateral displacement of each of the second and third positions from the optical axis Ax is 5 mm, the value of α is approximately represented by the following equation: α=4°. In addition, when an amount of lateral displacement of each of the fourth and fifth positions from the optical axis Ax is 10 mm, the value of β is approximately represented by the following equation: β=8°.

Next, operational effects of one or more embodiments of the present invention will be described.

The millimeter wave radar-equipped headlamp 50 according to one or more embodiments of the present invention has a structure in which the antenna module 32 of the millimeter wave radar 30 is incorporated into the projector type lighting device unit 10 including the shade 18 in such a manner that the shared use of the projection lens 12 is enabled. In one or more embodiments of the present invention, the antenna module 32 is formed to include: the five millimeter wave waveguides 34 located below the optical axis Ax and in the vicinity of the front of the shade 18; and the single millimeter wave reflection mirror 36 located between the openings 34a of the five millimeter wave waveguides 34 and the shade 18, thus making it possible to obtain the following operational effects.

Specifically, blockage of reflection light from the reflector 16 due to the incorporation of the antenna module 32 into the lighting device unit 10 can be prevented from occurring. Further, the adoption of such a structure can prevent the millimeter wave radar 30 from being seen directly through the translucent cover 52 of the headlamp 50, thereby making it possible to prevent the appearance of the headlamp 50 from being degraded. Moreover, the adoption of such a structure can eliminate the necessity for newly ensuring a placement space for the millimeter wave radar 30 inside the lighting chamber, thereby allowing the headlamp 50 to have a compact and simple structure.

Besides, in the millimeter wave radar-equipped headlamp 50 according to one or more embodiments of the present invention, the reflection surface 36a of the millimeter wave reflection mirror 36 is formed by the spheroidal surface by which the point F1 located in the vicinity of the opening 34a of the millimeter wave waveguide 34 placed at the first position (i.e., the position directly below the optical axis Ax) is defined as the first focal point, and the certain point F2 located forward of the rear focal point F of the projection lens is defined as the second focal point. Hence, the millimeter waves, emitted from the opening 34a of the millimeter wave waveguide 34 placed at the first position and the openings 34a of the adjacent millimeter wave waveguides 34 placed at the second to fifth positions, will be emitted as plane waves toward an area ahead of the vehicle via the projection lens 12, thus making it possible to ensure the functions of the millimeter wave radar 30.

According to one or more embodiments of the present invention, in the millimeter wave radar-equipped headlamp 50 realized by being equipped with the millimeter wave radar 30 for detecting an object ahead of the vehicle, the headlamp 50 is not degraded in appearance, is made compact and simple in structure, and is capable of ensuring the functions of the millimeter wave radar 30 as described above.

In addition, in one or more embodiments of the present invention, the antenna module 32 of the millimeter wave radar 30 includes the five millimeter wave waveguides 34 by which the millimeter wave emission ranges Z1 to Z5 overlap one another in an area ahead of the vehicle. Hence, a wide emission range can be ensured as a whole, thus allowing a detectable range of an object ahead of the vehicle to be increased in a lateral direction.

Note that one or more embodiments of the present invention has been described on the assumption that the antenna module 32 includes the five millimeter wave waveguides 34, but the antenna module 32 may alternatively be formed to include six or more millimeter wave waveguides 34 or four or less millimeter wave waveguides 34. In this alternate embodiment, even if the antenna module 32 includes the single millimeter wave waveguide 34, detection of existence or non-existence of a front-running vehicle 4, a distance between the vehicle 2 and the front-running vehicle 4, and the like is enabled as illustrated in FIG. 3A upon placement of the millimeter wave waveguide 34 at the first position.

Further, one or more embodiments of the present invention has been described on the assumption that the projection lens 12 is an acrylic resin lens, but a synthetic resin lens of the other type, such as a polycarbonate resin lens or a styrene-based resin lens, for example, may also be used.

Moreover, one or more embodiments of the present invention has been described on the assumption that the lighting device unit 10 is formed to produce the low beam light distribution pattern PL for left light distribution, but operational effects similar to those obtained by one or more embodiments of the present invention are obtainable also when the lighting device unit 10 is formed to produce a low beam light distribution pattern for right light distribution.

Next, variations of the foregoing embodiments will be described.

First, a first variation of the foregoing embodiments will be described.

Figure 4:
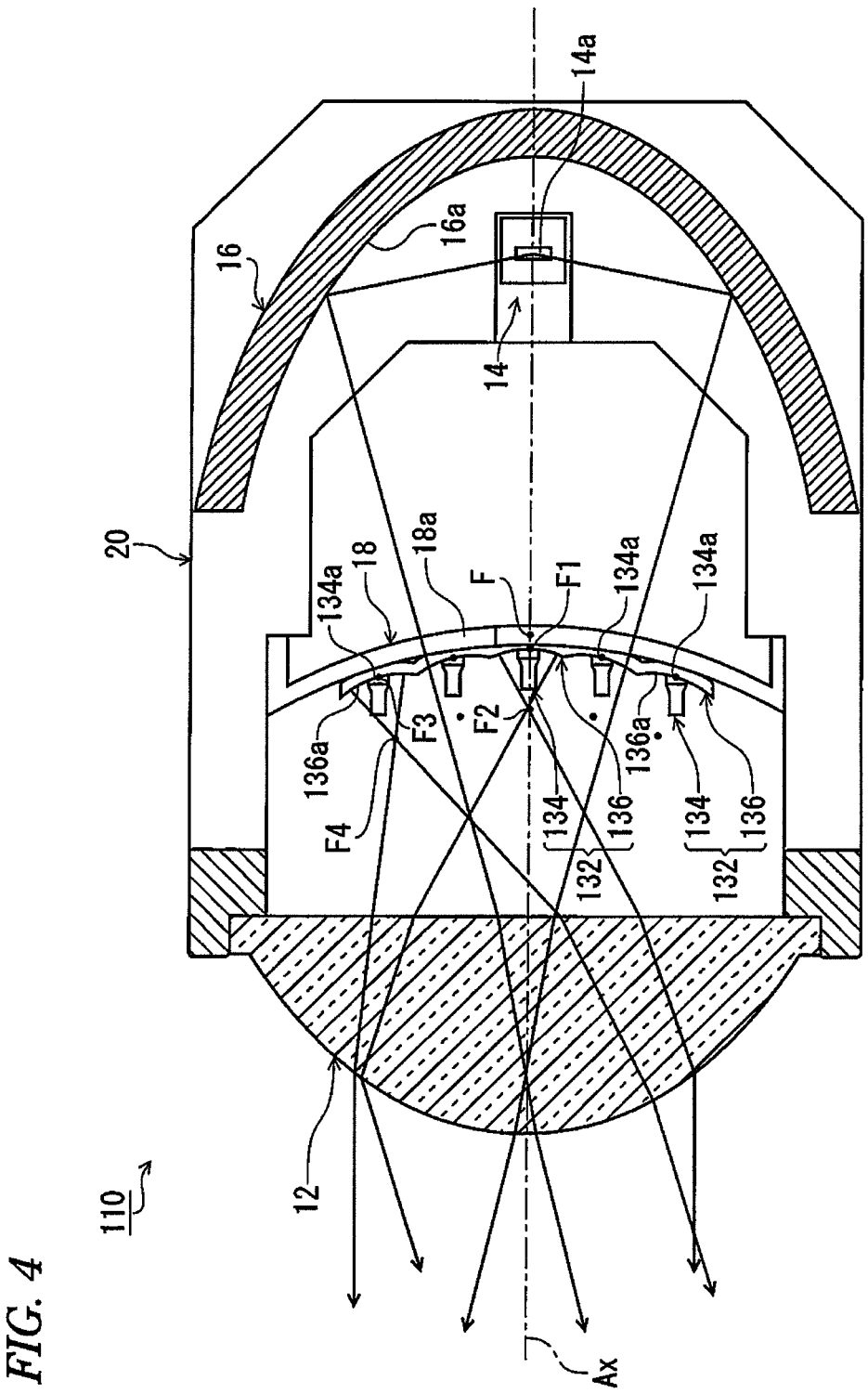
FIG. 4 is a diagram which illustrates a lighting device unit according to a first variation of the foregoing embodiments and which is substantially similar to FIG. 2.

FIG. 4 is a diagram which illustrates a lighting device unit 110 according to the present variation and which is substantially similar to FIG. 2.

As illustrated in FIG. 4, the lighting device unit 110 according to the present variation is similar in basic structure to the lighting device unit 10 according to the foregoing embodiments, but each antenna module 132 of a millimeter wave radar incorporated into the lighting device unit 110 has a structure partially different from that of the antenna module 32 according to the foregoing embodiments.

Specifically, in the present variation, the five antenna modules 132 are formed so as to be placed at regular intervals in a lateral direction. The five antenna modules 132 are placed at a first position directly below an optical axis Ax, second and third positions located somewhat laterally outwardly of the first position, and fourth and fifth positions located somewhat laterally outwardly of the second and third positions.

Each of the antenna modules 132 includes: a millimeter wave waveguide 134 located below the optical axis Ax and in the vicinity of the front of a shade 18; and a millimeter wave reflection mirror 136 located between an opening 134a of the millimeter wave waveguide 134 and the shade 18. Note that the millimeter wave reflection mirrors 136 of the five antenna modules 132 are formed integrally with each other.

Each millimeter wave waveguide 134 is similar in structure to the millimeter wave waveguide 34 according to the foregoing embodiments. However, a lateral interval between the adjacent millimeter wave waveguides 134 is set to be larger than that between the adjacent millimeter wave waveguides 34 according to the foregoing embodiments.

Further, as for a structure of each millimeter wave reflection mirror 136, the structure of the millimeter wave reflection mirror 136 of the antenna module 132 located at the first position is similar to that of the millimeter wave reflection mirror 36 according to the foregoing embodiments. Specifically, a reflection surface 136a of this millimeter wave reflection mirror 136 is formed by a spheroidal surface by which a point F1 located in the vicinity of the opening 134a of the millimeter wave waveguide 134 is defined as a first focal point, and a certain point F2 located at a rear focal point of a projection lens 12 for millimeter waves (i.e., a point located forward of a rear focal point F of the projection lens 12 on the optical axis Ax) is defined as a second focal point.

Furthermore, the reflection surfaces 136a of the millimeter wave reflection mirrors 136 of the antenna modules 132 located at the second to fifth positions are each formed by a spheroidal surface by which a point F3 located in the vicinity of the opening 134a of the millimeter wave waveguide 134 is defined as a first focal point, and a certain point F4 located at a lateral position with respect to the certain point F2 on a rear focal plane of the projection lens 12 for millimeter waves is defined as a second focal point.

Also, when the structure of the present variation is adopted, a detectable range of an object ahead of a vehicle can be increased in a lateral direction.

Next, a second variation of the foregoing embodiments will be described.

Figure 5:
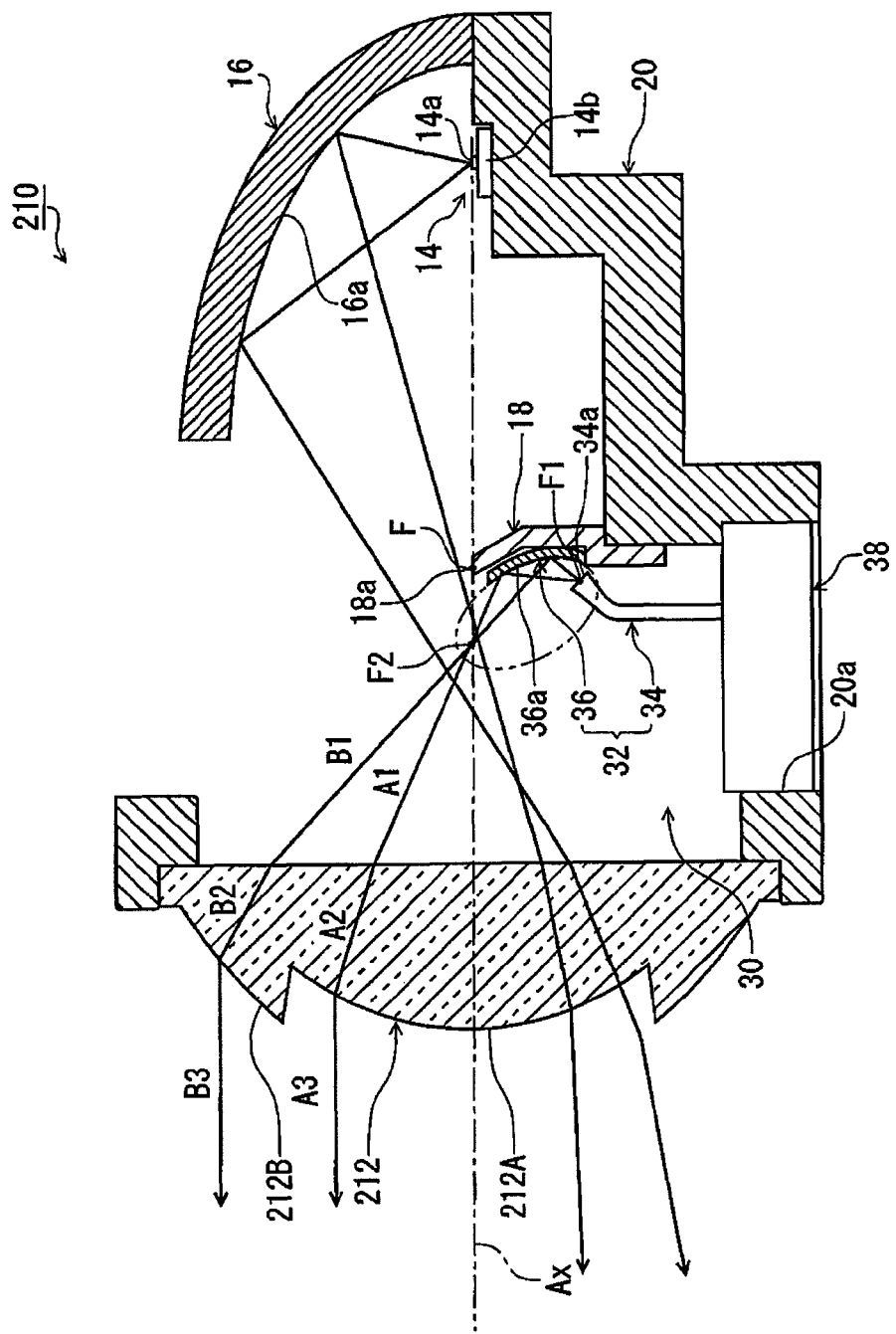
FIG. 5 is a diagram which illustrates a lighting device unit according to a second variation of the foregoing embodiments and which is substantially similar to FIG. 1.

FIG. 5 is a diagram which illustrates a lighting device unit 210 according to the present variation and which is substantially similar to FIG. 1.

As illustrated in FIG. 5, the lighting device unit 210 according to the present variation is similar in basic structure to the lighting device unit 10 according to the foregoing embodiments, but a projection lens 212 of the lighting device unit 210 has a structure partially different from that of the projection lens 12 according to the foregoing embodiments. Note that a millimeter wave radar 30 incorporated into the lighting device unit 210 has a structure similar to that of the millimeter wave radar 30 according to the foregoing embodiments.

The projection lens 212 of the lighting device unit 210 according to the present variation is formed as a Fresnel lens. Specifically, unlike the projection lens 12 according to the foregoing embodiments, the projection lens 212 is formed so that an annular step is provided at its frontward surface.

In this variation, for the projection lens 212 formed as a Fresnel lens, an optical path difference between a center portion 212A and a peripheral edge portion 212B of the projection lens 212 is set at an integral multiple of a wavelength of a millimeter wave used by the millimeter wave radar.

Specifically, a path length (optical path) A for a millimeter wave passing through the center portion 212A of the Fresnel lens is represented by the following equation: A=A1+nA2+A3, and a path length (optical path) B for a millimeter wave passing through the peripheral edge portion 212B of the Fresnel lens is represented by the following equation: B=B1+nB2+B3.

In these equations, A1 and B1 each represent a length from the certain point F2 to a rearward surface of the projection lens 212, A2 and B2 each represent a length within the projection lens 212, A3 and B3 each represent a length from the frontward surface of the projection lens 212 to the same wavefront located forward of the frontward surface, and n represents a refractive index of an acrylic resin, constituting the projection lens 212, with respect to a millimeter wave.

Furthermore, settings are made so that the following equation holds true:

$$|A-B|=k\lambda$$

In this equation, k represents an integer, and λ represents a wavelength of a millimeter wave used by the millimeter wave radar 30.

The adoption of the structure of the present variation can align phases of millimeter waves passing through the projection lens 212 in spite of the fact that the projection lens 212 is formed as a Fresnel lens. Thus, the projection lens 212 can be reduced in thickness, and attenuation of millimeter waves due to passage through the projection lens 212 can be minimized.

Besides, because the projection lens 212 is made of an acrylic resin, the projection lens 212 is formed as a Fresnel lens, thereby making it possible to improve formability thereof and to take countermeasures against heat.

Next, a third variation of the foregoing embodiments will be described.

Figure 6:
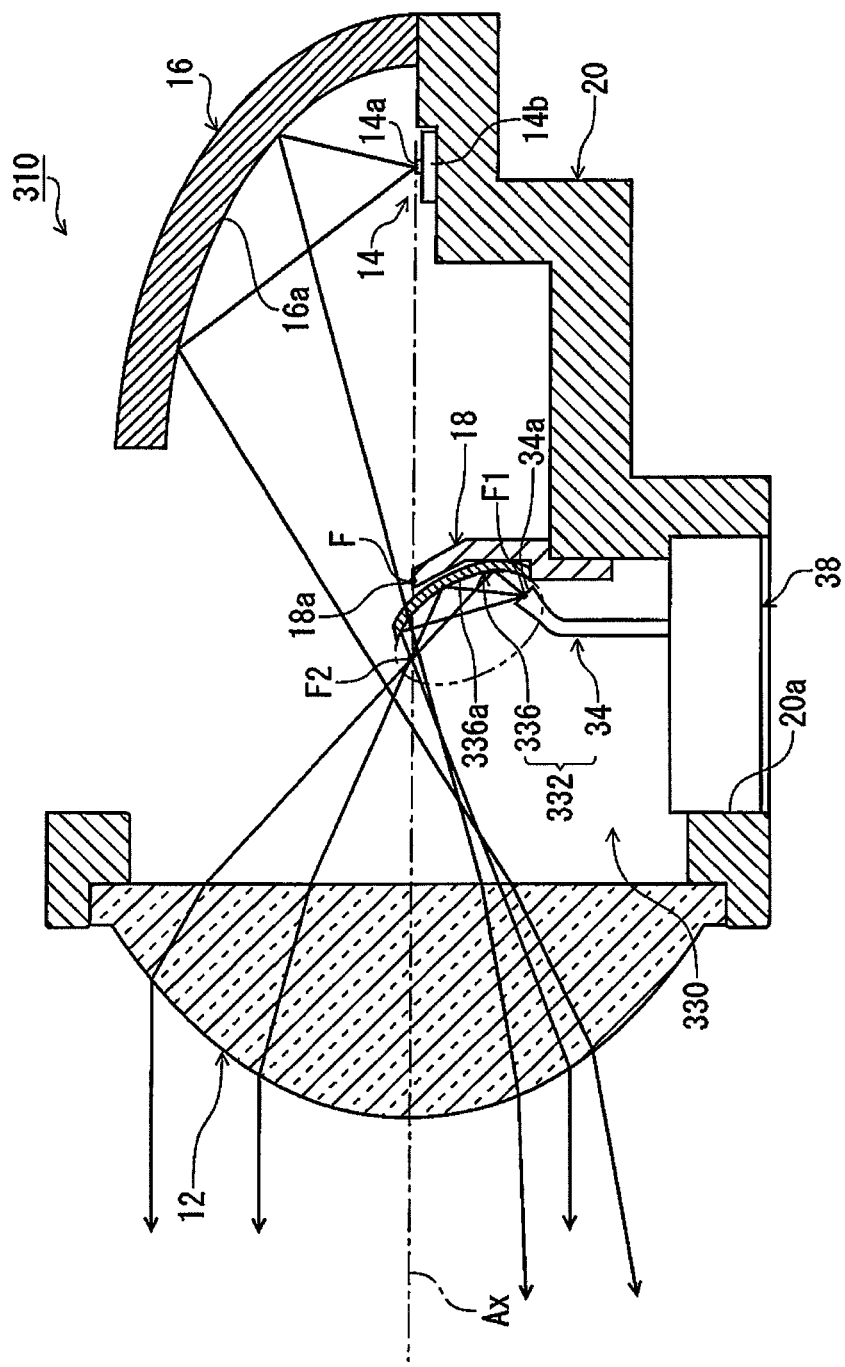
FIG. 6 is a diagram which illustrates a lighting device unit according to a third variation of the foregoing embodiments and which is substantially similar to FIG. 1.

FIG. 6 is a diagram which illustrates a lighting device unit 310 according to the present variation and which is substantially similar to FIG. 1.

As illustrated in FIG. 6, the lighting device unit 310 according to the present variation is similar in basic structure to the lighting device unit 10 according to the foregoing embodiments, but an antenna module 332 of a millimeter wave radar 330 incorporated into the lighting device unit 310 has a structure partially different from that of the antenna module 32 according to the foregoing embodiments.

Specifically, a millimeter wave reflection mirror 336 of the antenna module 332 according to the present variation includes a member that allows visible light to pass therethrough, and an upper end portion of the millimeter wave reflection mirror 336 is formed by being extended above an optical axis Ax. Specifically, the millimeter wave reflection mirror 336 is formed by providing a meshed metal evaporation film at a front face of a colorless transparent synthetic resin plate (e.g., an acrylic resin plate), and a front face of the film constitutes a reflection surface 336a.

The adoption of the structure of the present variation enables utilization of more millimeter waves while the millimeter wave reflection mirror 336 blocks virtually no reflection light from a reflector 16.

Next, a fourth variation of the foregoing embodiments will be described.

Figure 7:
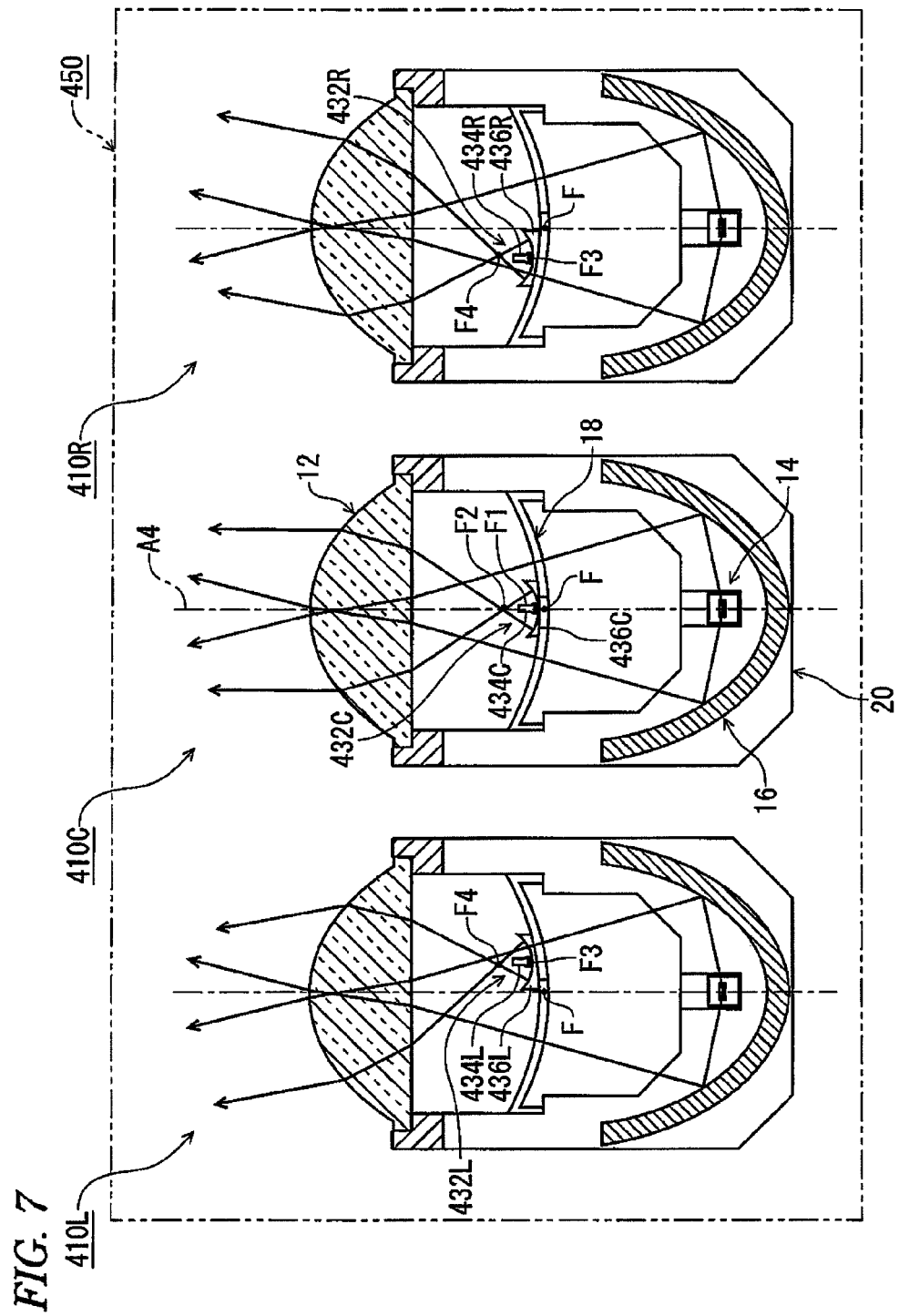
FIG. 7 is a diagram which illustrates a millimeter wave radar-equipped headlamp according to a fourth variation of the foregoing embodiments and which is substantially similar to FIG. 2.

FIG. 7 is a diagram which illustrates a millimeter wave radar-equipped headlamp 450 according to the present variation and which is substantially similar to FIG. 2.

As illustrated in FIG. 7, the millimeter wave radar-equipped headlamp 450 according to the present variation is formed so that three lighting device units 410C, 410L and 410R are arranged in parallel with each other in a lateral direction.

The lighting device units 410C, 410L and 410R are each similar in basic structure to the lighting device unit 10 according to the foregoing embodiments, but antenna modules 432C, 432L and 432R of millimeter wave radars incorporated into the lighting device units 410C, 410L and 410R each have a structure partially different from that of the antenna module 32 according to the foregoing embodiments.

Specifically, the antenna module 432C of the millimeter wave radar incorporated into the lighting device unit 410C located at the center is placed below an optical axis Ax, and a point F1, located in the vicinity of an opening of a millimeter wave waveguide 434C of the antenna module 432C, and a certain point F2 are located directly below the optical axis Ax. Thus, millimeter waves, emitted from the opening of the millimeter wave waveguide 434C of the antenna module 432C and reflected by a millimeter wave reflection mirror 436C thereof, are allowed to be emitted as plane waves parallel to the optical axis Ax through a projection lens 12 toward an area ahead of a vehicle.

The antenna module 432L of the millimeter wave radar, incorporated into the lighting device unit 410L located at the left side, is placed at a position located obliquely downward toward the right with respect to the optical axis Ax, and a point F3, located in the vicinity of an opening of a millimeter wave waveguide 434L of the antenna module 432L, and a certain point F4 are also placed at positions located obliquely downward toward the right with respect to the optical axis Ax. Thus, millimeter waves, emitted from the opening of the millimeter wave waveguide 434L of the antenna module 432L and reflected by a millimeter wave reflection mirror 436L thereof, are allowed to be emitted as plane waves through the projection lens 12 toward an area ahead of the vehicle in a left oblique direction thereof at a horizontal deflection angle responsive to an amount of lateral displacement from the optical axis Ax.

The antenna module 432R of the millimeter wave radar, incorporated into the lighting device unit 410R located at the right side, is placed at a position located obliquely downward toward the left with respect to the optical axis Ax, and a point F3, located in the vicinity of an opening of a millimeter wave waveguide 434R of the antenna module 432R, and certain point F4 are also placed at positions located obliquely downward toward the left with respect to the optical axis Ax. Thus, millimeter waves, emitted from the opening of the millimeter wave waveguide 434R of the antenna module 432R and reflected by a millimeter wave reflection mirror 436R thereof, are allowed to be emitted as plane waves through the projection lens 12 toward an area ahead of the vehicle in an oblique right direction thereof at a horizontal deflection angle responsive to an amount of lateral displacement from the optical axis Ax.

Also when the structure of the present variation is adopted, a detectable range of an object ahead of the vehicle can be increased in a lateral direction.

Note that in the present variation, a low beam light distribution pattern is produced as a combined light distribution pattern in which three light distribution patterns formed by light applied from the three lighting device units 410C, 410L and 410R are combined with each other.

Next, a fifth variation of the foregoing embodiments will be described.

Figure 8:
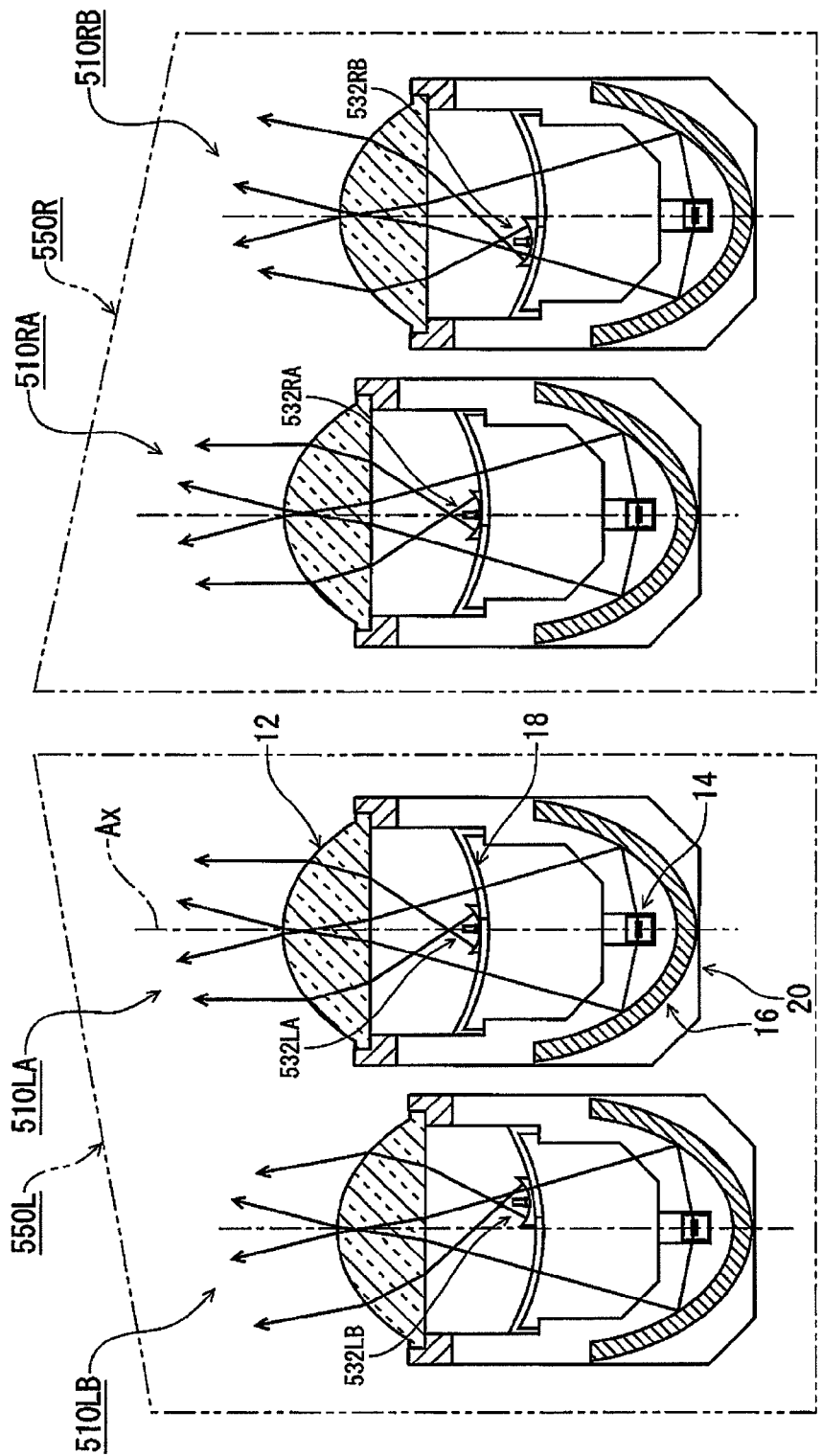
FIG. 8 is a diagram which illustrates millimeter wave radar-equipped headlamps according to a fifth variation of the foregoing embodiments and which is substantially similar to FIG. 2.

FIG. 8 is a diagram which illustrates millimeter wave radar-equipped headlamps 550L and 550R according to the present variation and which is substantially similar to FIG. 2.

As illustrated in FIG. 8, the millimeter wave radar-equipped headlamp 550L according to the present variation serves as a left side lighting apparatus placed at a left front end portion of a vehicle, and the millimeter wave radar-equipped headlamp 550R according to the present variation serves as a right side lighting apparatus placed at a right front end portion of the vehicle.

Further, the left side millimeter wave radar-equipped headlamp 550L is formed so that two lighting device units 510LA and 510LB are arranged in parallel with each other in a lateral direction in a state where the lighting device unit 510LA, located inwardly with respect to a vehicle width direction, is displaced slightly toward the front. In this variation, the lighting device unit 510LA and a millimeter wave radar antenna module 532LA incorporated into the lighting device unit 510LA have structures similar to those of the lighting device unit 410C and millimeter wave radar antenna module 432C according to the fourth variation. Furthermore, the lighting device unit 510LB and a millimeter wave radar antenna module 532LB incorporated into the lighting device unit 510LB have structures similar to those of the lighting device unit 410L and millimeter wave radar antenna module 432L according to the fourth variation.

On the other hand, the right side millimeter wave radar-equipped headlamp 550R is formed so that two lighting device units 510RA and 510RB are arranged in parallel with each other in a lateral direction in a state where the lighting device unit 510RA, located inwardly with respect to the vehicle width direction, is displaced slightly toward the front. In this variation, the lighting device unit 510RA and a millimeter wave radar antenna module 532RA incorporated into the lighting device unit 510RA have structures similar to those of the lighting device unit 410C and millimeter wave radar antenna module 432C according to the fourth variation. Furthermore, the lighting device unit 510RB and a millimeter wave radar antenna module 532RB incorporated into the lighting device unit 510RB have structures similar to those of the lighting device unit 410R and millimeter wave radar antenna module 432R according to the fourth variation.

Note that in the present variation, a low beam light distribution pattern is produced as a combined light distribution pattern in which four light distribution patterns formed by light applied from the four lighting device units 510LA, 510LB, 510RA and 510RB are combined with each other.

Also, when the structure of the present variation is adopted, a detectable range of an object ahead of the vehicle can be increased in a lateral direction for the vehicle as a whole with the use of a pair of the right and left millimeter wave radar-equipped headlamps 550R and 550L.

Note that numerical values given as specifications in the foregoing embodiments and variations thereof are provided by way of example only, and therefore, these values may naturally be set at different values as appropriate. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A millimeter wave radar-equipped headlamp comprising:
   a millimeter wave radar that detects an object ahead of a vehicle, wherein the millimeter wave radar comprises an antenna module; and
   a lighting device unit that irradiates an area ahead of the vehicle, wherein the lighting device unit incorporates the antenna module,
   wherein the lighting device unit comprises:
      a projection lens located on an optical axis extending in a longitudinal direction of the vehicle;
      a light source that emits light located behind a rear focal point of the projection lens;
      a reflector that reflects the light emitted from the light source toward the projection lens; and
      a shade that partially blocks the light reflected by the reflector,
   wherein an upper edge of the shade is located in the vicinity of the optical axis,
   wherein the antenna module comprises:
      a millimeter wave waveguide located below the optical axis and in the vicinity of the front of the shade; and
      a millimeter wave reflection mirror located between an opening of the millimeter wave waveguide and the shade,
   wherein a reflection surface of the millimeter wave reflection mirror is formed by a spheroidal surface having a first focal point located in a vicinity of the opening of the millimeter wave waveguide, and a second focal point located forward of the rear focal point, and
   millimeter waves emitted from the opening of the millimeter wave waveguide is reflected by the reflection surface and emitted through the projection lens.

2. The millimeter wave radar-equipped headlamp according to claim 1, further comprising: a plurality of the millimeter wave waveguide, wherein the plurality of the millimeter wave waveguides are placed at regular intervals in a lateral direction.

3. The millimeter wave radar-equipped headlamp according to claim 1, further comprising: a plurality of the antenna module, wherein the plurality of the antenna modules are placed at regular intervals in a lateral direction.

4. The millimeter wave radar-equipped headlamp according to claim 1, further comprising: a plurality of the lighting device unit, wherein positions of each antenna module incorporated into the lighting device units are set at positions deviated from each other in a lateral direction between the lighting device units.

5. The millimeter wave radar-equipped headlamp according to claim 1, wherein the projection lens is formed as a Fresnel lens, and wherein an optical path difference between lens portions of the Fresnel lens is set at an integral multiple of a wavelength of a millimeter wave used by the millimeter wave radar.

6. The millimeter wave radar-equipped headlamp according to claim 2, wherein the projection lens is formed as a Fresnel lens, and wherein an optical path difference between lens portions of the Fresnel lens is set at an integral multiple of a wavelength of a millimeter wave used by the millimeter wave radar.

7. The millimeter wave radar-equipped headlamp according to claim 3, wherein the projection lens is formed as a Fresnel lens, and wherein an optical path difference between lens portions of the Fresnel lens is set at an integral multiple of a wavelength of a millimeter wave used by the millimeter wave radar.

8. The millimeter wave radar-equipped headlamp according to claim 4, wherein the projection lens is formed as a Fresnel lens, and wherein an optical path difference between lens portions of the Fresnel lens is set at an integral multiple of a wavelength of a millimeter wave used by the millimeter wave radar.

9. The millimeter wave radar-equipped headlamp according to claim 1, wherein the millimeter wave reflection mirror comprises a portion that allows visible light to pass therethrough, and wherein an upper end portion of the millimeter wave reflection mirror extends above the optical axis.

10. The millimeter wave radar-equipped headlamp according to claim 2, wherein the millimeter wave reflection mirror comprises a portion that allows visible light to pass therethrough, and wherein an upper end portion of the millimeter wave reflection mirror extends above the optical axis.

11. The millimeter wave radar-equipped headlamp according to claim 3, wherein the millimeter wave reflection mirror comprises a portion that allows visible light to pass therethrough, and wherein an upper end portion of the millimeter wave reflection mirror extends above the optical axis.

12. The millimeter wave radar-equipped headlamp according to claim 4, wherein the millimeter wave reflection mirror comprises a portion that allows visible light to pass therethrough, and wherein an upper end portion of the millimeter wave reflection mirror extends above the optical axis.

13. The millimeter wave radar-equipped headlamp according to claim 5, wherein the millimeter wave reflection mirror comprises a portion that allows visible light to pass therethrough, and wherein an upper end portion of the millimeter wave reflection mirror extends above the optical axis.

14. The millimeter wave radar-equipped headlamp according to claim 6, wherein the millimeter wave reflection mirror comprises a portion that allows visible light to pass therethrough, and wherein an upper end portion of the millimeter wave reflection mirror extends above the optical axis.

15. The millimeter wave radar-equipped headlamp according to claim 7, wherein the millimeter wave reflection mirror comprises a portion that allows visible light to pass therethrough, and wherein an upper end portion of the millimeter wave reflection mirror extends above the optical axis.

16. The millimeter wave radar-equipped headlamp according to claim 8, wherein the millimeter wave reflection mirror comprises a portion that allows visible light to pass therethrough, and wherein an upper end portion of the millimeter wave reflection mirror extends above the optical axis.

* * * * *